(12) United States Patent
James (10) Patent No.: US 7,673,347 B2
(45) Date of Patent: Mar. 2, 2010

(54) INFORMATION CONTROL IN FEDERATED INTERACTION

(75) Inventor: Frances James, Sunnyvale, CA (US)

(73) Assignee: SAP AG, Walldorf (DE)

( * ) Notice: Subject to any disclaimer, the term of this patent is extended or adjusted under 35 U.S.C. 154(b) by 1171 days.

(21) Appl. No.: 11/215,187

(22) Filed: Aug. 30, 2005

(65) Prior Publication Data

US 2007/0067852 A1 Mar. 22, 2007

(51) Int. Cl.
*H04L 9/00* (2006.01)
(52) U.S. Cl. ...................................... 726/28
(58) Field of Classification Search ............. 726/26–28, 726/29; 713/168, 182, 193
See application file for complete search history.

(56) References Cited

U.S. PATENT DOCUMENTS

| 6,002,427 | A | 12/1999 | Kipust |
| 6,189,105 | B1* | 2/2001 | Lopes ........................ 726/20 |
| 6,330,676 | B1 | 12/2001 | Kelsey |
| 2002/0152211 | A1 | 10/2002 | Jam |
| 2003/0037243 | A1* | 2/2003 | Gruteser et al. ............. 713/185 |
| 2004/0015729 | A1 | 1/2004 | Elms et al. |
| 2004/0255232 | A1 | 12/2004 | Hammond et al. |
| 2005/0105734 | A1* | 5/2005 | Buer et al. .................. 380/270 |
| 2005/0259611 | A1* | 11/2005 | Bhagwat et al. ............. 370/328 |
| 2006/0101275 | A1* | 5/2006 | Daniels et al. .............. 713/182 |

FOREIGN PATENT DOCUMENTS

| DE | 19543455 A1 | 11/1997 |
| EP | 0929024 A1 | 7/1999 |
| WO | WO 02/31787 A1 | 4/2002 |

OTHER PUBLICATIONS

Consolvo, Sunny, et al., "The CareNet Display: Lessons Learned from an In Home Evaluation of an Ambient Display", *Intel Research Seattle*, (Nov. 2004),17.
Pountain, Dick, "Track People with Active Badges", *BYTE*, (Dec. 1993),57-64.
Jahn, Richard "Drahtlos Prasentieren", CT Magazin Fuer Computertechnik, Hannover,DE, vol. 21, XP 002321469, (Oct. 6, 2004), pp. 120-123 (Concise English-Language Statement of Relevance for "Drahtlos präsentieren Bildschirminhalte per WLAN zum Projektor beamen," including cited portions from corresponding EP Search Report), p. 1.
"European Search Report for European Patent Application No. 06016834.1, mailed on Dec. 27, 2006", 4 pages.
"European Office Action for European Patent Application No. 06016834.1, mailed Jul. 15, 2008", 4 pages.

* cited by examiner

*Primary Examiner*—Beemnet W Dada
(74) *Attorney, Agent, or Firm*—Brake Hughes Bellermann LLP (57) ABSTRACT

Techniques are described for protecting information in a convenient and useful way. A user transmits information from a mobile device to an ambient display, so that other users may receive the information from the ambient display. A display controller detects a presence of a potentially unauthorized user relative to the ambient display, and modifies the outputting of the information at the ambient display so as to hide portions of the information that should not be seen by the potentially unauthorized user. The information, including the hidden portion, is nonetheless output, using one of a plurality of output channels of one or more secondary devices, either to the user and/or the other users. In this way, authorized users may continue to receive the information, and, moreover, may input an indication as to whether an extent of the hidden portion is sufficient to provide adequate security with regard to the information.

17 Claims, 5 Drawing Sheets

INFORMATION CONTROL IN FEDERATED INTERACTION

TECHNICAL FIELD

This description relates to control of sensitive information during federated interactions.

BACKGROUND

Presentation systems allow a user of a device to present content on a separate device. For example, a user of a laptop computer may wish to present contents of the laptop computer to other users, where the content may include, for example, a presentation, an image, an audio recording, or a text document. It may be inconvenient, however, for all of the viewing users to view the content on the screen of the laptop computer. In this case, the laptop user may make use of a larger screen or display that may be present, in order to present the content in a manner that is easily and comfortably viewable by everyone present.

SUMMARY

According to one general aspect, information is provided to a first device, for outputting to at least one recipient, using a first output mode. An authorization of a person in proximity to the first device to receive the information is determined. A subset of the information is prevented from being output at the first device using the first output mode, based on the authorization, and at least the subset of the information is output to the recipient at a second device, using a second output mode.

Implementations may include one or more of the following features. For example, providing information to a first device may include transmitting the information from a mobile device to the first device, where the mobile device is in proximity to the first device and the first device includes a multi-user display as the first output mode. Providing information to a first device may include transmitting the information for an audio and/or visual display thereof at the first device.

Determining an authorization of a person in proximity to the first device to receive the information may include receiving location information regarding a location of the person relative to the first device. In this case, receiving location information regarding a location of the person relative to the first device may include receiving information at a sensor from an identifier associated with the person. Determining an authorization of a person in proximity to the first device to receive the information may include accessing security information associated with the person, relative to the information.

Preventing a subset of the information from being output at the first device using the first output mode may include blocking visual portions of the information displayed at the first device. In this case, blocking visual portions of the information displayed at the first device may include re-transmitting the information to the first device with blocked-out visual portions.

Preventing a subset of the information from being output at the first device using the first output mode may include receiving a designation of at least a part of the subset from a user of a transmitting device that transmits the information to the first device. Outputting at least the subset of the information to the recipient at a second device may include outputting at least the subset of the information at a mobile device from which the information was transmitted to the first device.

Outputting at least the subset of the information to the recipient at a second device may include outputting either an audio, video, text, and/or image within the information at the second device as audio output as the second output mode, and/or may include outputting at least the subset of the information at a mobile device of a presenting user, from which the information was transmitted to the first device, and outputting at least the subset of the information to a computing device of the recipient, where the recipient is a non-presenting recipient of the information. Additionally, or alternatively, outputting at least the subset of the information to the recipient at a second device may include receiving an indication of greater and/or lesser security from the recipient, and outputting a modified subset to the recipient, based on the indication.

According to another general aspect, a system includes an originating device operated by a presenting user, that is operable to output information to an output device, for receipt therefrom by a recipient, and an output controller that is operable to determine a presence of an additional user relative to the output device, and further operable to prevent at least a portion of the information from being output at the output device, wherein the output controller is further operable to output at least the portion of the information at a secondary output, for receipt thereof by the recipient.

Implementations may include one or more of the following features. For example, the originating device may be operable to provide the secondary output. The secondary output may include a visual and/or auditory output at a secondary device that is local to the recipient and separate from the originating device. The originating device may be operable to receive an input of the presenting user and/or the recipient, and may be further operable to modify the portion of the information based thereon.

According to another general aspect, an apparatus includes a storage medium having instructions stored thereon. The instructions include a first code segment for determining a transmission of information from an originating device to a multi-user output device, for receipt therefrom by a recipient, a second code segment for determining a presence of a potentially-unauthorized user relative to the multi-user output device, a third code segment for blocking a portion of the information from output by the multi-user output device, based on the presence, and a fourth code segment for outputting at least the portion of the information at a secondary output, for receipt therefrom by the recipient.

Implementations may include one or more of the following features. For example, the recipient may include either an originating user of the information at the originating device, and/or a receiving user of the information at a receiving device that is separate from the originating device. Additionally, or alternatively, a fifth code segment may be included for receiving a modification of the portion of the information from either the originating user and/or the receiving user, and a sixth code segment may be included for modifying the blocking of the portion of the information, based on the modification.

The details of one or more implementations are set forth in the accompanying drawings and the description below. Other features will be apparent from the description and drawings, and from the claims.

DETAILED DESCRIPTION

Figure 1:
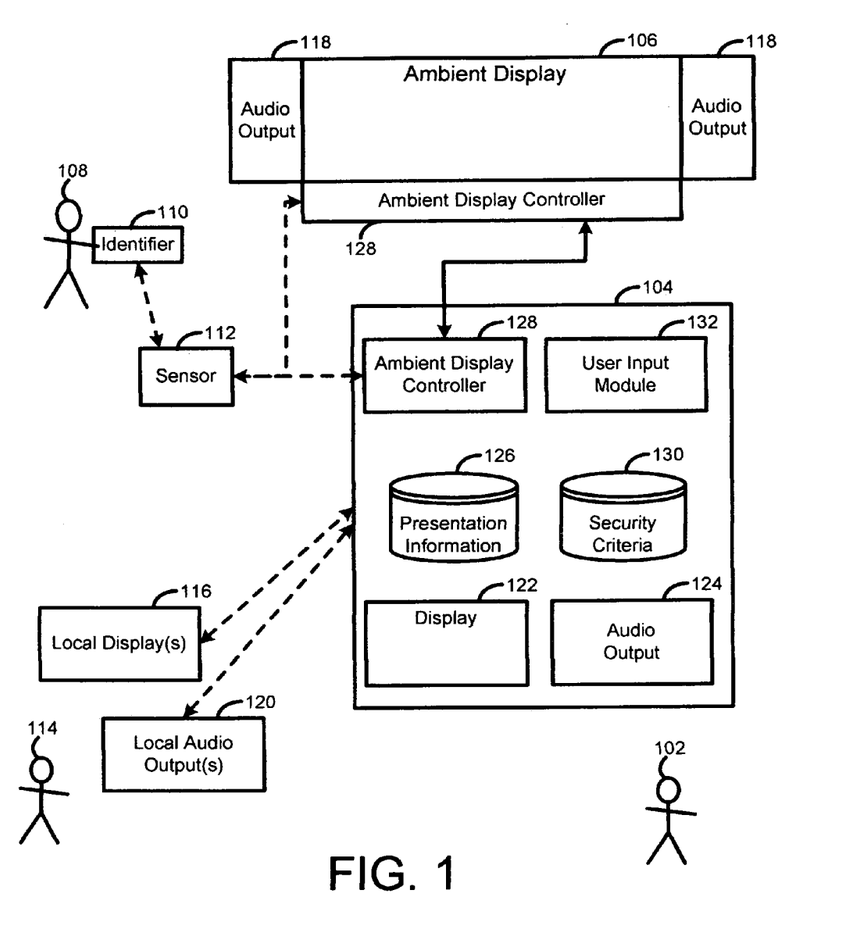
FIG. 1 is a block diagram of a system for information control in a federated interaction.

FIG. 1 is a block diagram of a system 100 for information control in a federated interaction. Federated interactions may include, for example, situations in which parties may work together or otherwise be involved with one another, and, in particular, situations in which the parties are physically co-located, or may potentially be co-located.

For example, business partners/collaborators, or potential business partners/collaborators, may come together to discuss how to work with one another. In particular, potential investors in a company may visit a company site on a given day. More generally, any number of persons or types of persons may visit a company or other site at any given time, including, for example, non-company personnel such as tourists, competitors, or customers, as well as company personnel such as members of a sales/marketing team or janitorial staff.

In FIG. 1, then, a user 102 uses a mobile computing device 104 to transmit information content to an ambient display 106. For example, the user 102 may be making a presentation to co-workers regarding a new product prototype, or regarding current sales of an existing product line. The mobile device 104 may be virtually any mobile computing device, including, for example, a personal digital assistant (PDA), a laptop computer, or a tablet Personal Computer (PC). The display 106 may be any audio/visual display that is present at the site or venue of interest, and that is available to authorized users for making presentations or other showings of desired content.

Thus, since the mobile device 104 may be too small to allow direct viewing by recipients of the presentation, communication between the mobile device 104 and the display 106 allows for convenient presentation to a larger number of recipients than would the mobile device by itself. In so doing, however, such a use of the ambient display 106 also allows unauthorized visitors and other potential viewers who may be within a viewing distance thereof to observe private or confidential information.

As described in more detail below, the system 100 is operable to prevent such an occurrence, by, for example, selectively blocking portions of the information content transmitted to the ambient display 106 from the mobile device 104, based on, for example, a security clearance of the unauthorized visitors and/or other potential viewers. Moreover, the system 100 allows the user 102, or other authorized users, to continue to view the blocked or hidden portions of information content on the display 106, using local, private, and/or individually-controllable devices (such as the mobile device 104, itself).

For example, during a presentation by the user 102, using the ambient display 106, an unauthorized user 108 may approach. For example, the user 108 may be one of the classes of visitors or other parties mentioned above, or may be any other type of visitor or viewer who is unauthorized to observe the information content on the ambient display 106. In inadvertently viewing the display 106, for example, the user 108 may enter a conference room containing the display 106, or may walk past an open area containing the display 106.

In FIG. 1, the user 108 is wearing an identifier 110. For example, the identifier 110 may represent a Radio Frequency Identification (RFID) tag, or other type of identifier that outputs a signal that may be detected by a sensor 112. The identifier 110 may store, or otherwise enable access to, information about the user 108, and, in particular, about a security level of the user 108. The identifier 110 may be provided to the user 108 upon entry to a premises containing the ambient display 106, and/or may be required to be worn by all persons within a particular building or location housing the display 106.

Thus, as the user 108 passes a vicinity of the ambient display 106 and/or the mobile device 104, the sensor 112 detects the identifier 110 and communicates with the mobile device 104, the ambient display 106, and/or a separate computing device that may be involved with the transmission of information content between the mobile device 104 and the display 106. Based on the communication with the sensor 112, at least some of the information content on the ambient display 106 is blocked or otherwise restricted, in order to avoid viewing thereof by the unauthorized user 108.

Additionally, as described in more detail below, the blocked information content may still be provided, in an original and/or alternate form, to the user 102, using the mobile device 104. Further, the blocked information may similarly be provided to a user 114 who may be an originally-intended recipient of the information content, using, for example, a display 116 that is local to the user 114 and not viewable by the unauthorized user 108 (e.g., a PDA, laptop computer, or tablet PC of the user 114). In this way, even though the unauthorized viewer 108 may be prevented from receiving appropriate portions of the information content, intended viewers of the content may still view the content, albeit not, at least temporarily, using the ambient display 106.

Information content that is blocked from presentation using the ambient display 106 may include both visual and auditory information. Thus, for example, the ambient display 106 may include, or be associated with, audio output elements 118 (e.g., audio speakers). Similarly, the user 114 may have access to local audio output(s) 120 (e.g., speakers, headphones, and/or an earpiece). Of course, as referenced above, the mobile device 104 also may typically be associated with both a visual display 122 and/or an audio output 124.

Accordingly, the system 100 may make use of some or all of these output channels, and others, in order to control the dissemination of secure information that may originate from the mobile device 104. Thus, as described, the (potentially) unauthorized user 108 is prevented from receiving restricted information content, while the intended recipients 102 and/or 114 continue to receive the information content, by way of at least one device and/or output channel/type.

Further, the user 102 retains the ability to observe and control the information content, by way of the mobile device 104. For example, the user 102 may decide that the user 108 is, in fact, authorized to see some or all of the restricted information content, and so may operate the mobile device 104 to cause the ambient display 106 to (re-)display some or all of the restricted portion(s) of the information content. Conversely, the user 102 may decide that the unauthorized user 108 should be further restricted from observing the information content than indicated by analysis of the identifier 110, and so may block out additional portions of the information content (where, again, such additional portions may then be continually output to the intended recipient(s), such as the user 114, using local outputs 116/120). Other features and advantages are described in more detail, herein.

In operation, then, the mobile device 104 is illustrated, in the example of FIG. 1, as containing presentation content 126. For example, the presentation content 126 may include presentation slides that were prepared by the user 102. As another example, the presentation content 126 may include information that the user 102 is currently obtaining from a remote server or other computer, e.g., the user 102 may be displaying a live web page on the ambient display 106. Of course, the presentation content 126 may include virtually any other type of information that may be transmitted to the display 106 (and/or the audio outputs 118), such as, for example, images, audio and/or video streams, text documents, or spreadsheets.

As already described, the presentation content 126 may be output over the local display 122 and/or audio output 124 of the mobile device 104. At the same time, the presentation content 126 may be output to the ambient display 106, using an ambient display controller 128. In FIG. 1, the ambient display controller 128 is illustrated as being at least partially local both to the mobile device 104, and to the display 106, itself. Thus, FIG. 1 illustrates that functionality of the ambient display controller 128 (e.g., the functionality of transmitting the presentation content 126 from the mobile device 104 for output by the display 106) may be implemented at either and/or both of the mobile device 104 and/or the display 106. As described in more detail below, functionality of the display controller 128 also may be implemented remotely from either or both of the display 106 and/or the mobile device 104, over a network that is accessible to those devices.

Although techniques are known for providing content from a mobile computing device to a larger display screen, specific examples are provided herein for the sake of illustration of the use of these and other techniques in obtaining the various features and advantages described herein. Other features of known techniques, such as, for example, an ability of the mobile device 104 to "discover" and initiate contact with the display 106, perhaps using the ambient display controller 128, are not discussed herein in detail.

As described above, the mobile device 104 may continue transmitting the presentation content 126 for output on the display 106, until the sensor 112 detects a presence of the user 108 and/or the identifier 110. At this point, the ambient display controller 128 compares the presentation content 126 against security criteria 130. For example, in a simple case, the display controller 128 may default to blocking all of the presentation content 126 from the display 106, unless and until the user 102 indicates otherwise.

In other implementations, the controller 128 may determine either an identity (e.g., a name) or a class (e.g., visitor) of the user 108, and may then associate this information with a security clearance determined from the security criteria 130, for comparison thereof against the presentation content 126. For example, the user presence/identity and security information may be compared against a type of data of the presentation content 126, and/or an association of the presentation content data with other data (e.g., association with e-mail recipients, classification within a file structure, or other associated information).

Thus, in some implementations, as mentioned, the controller 128 may act to disrupt the entire transmission of content to the display 106, e.g., to block an entire screen of the display 106. In other implementations, the controller 128 may compare the identity information of the user 108 with the security criteria 130 and/or the presentation content 126, and may obscure portions thereof on a portion-by-portion basis. In this way, only those portions that should not be viewed by the user 108 are restricted from output by the display 106.

Advantageously, the display controller 128 may continue to output the presentation content 126 on the display 122 and/or the audio output 124 of the mobile device 104. Additionally, or alternatively, the controller 128 may output at least the restricted content to the display 116 and/or audio output 120 of the user 114. Such additional outputs may be provided only when the user 108 is within a vicinity of the display 106, or, in other implementations, may constantly be provided in a concurrent manner with output of the presentation content on the display 106 (so that, in the latter example, the user 114 may choose whichever output device provides the most convenient reception).

In the examples described herein, the user 102 may use a user interface (UI) module 132 to, among other tasks, initiate or modify an action of the display controller 128. For example, the user 102 may determine that the action of the display controller 128 was either too restrictive or not restrictive enough in blocking information content provided on the display 106. In such cases, the user 102 may use various input techniques, e.g., stylus, keyboard, mouse, finger-tracker, voice-recognition, or other input technique, to designate a desired increase or decrease in the output of the presentation content 126 on the display 106. Specific examples of such user modification are provided in more detail herein.

Thus, the user 102 retains the advantages provided by the use of the ambient display 106, such as, for example, an ease and convenience of providing the presentation content 126 in an ad hoc manner. Additionally, as described, the user 102 need not be concerned that, in so doing, secure information may be disseminated to unauthorized parties, such as the unauthorized user 108.

Figure 2:
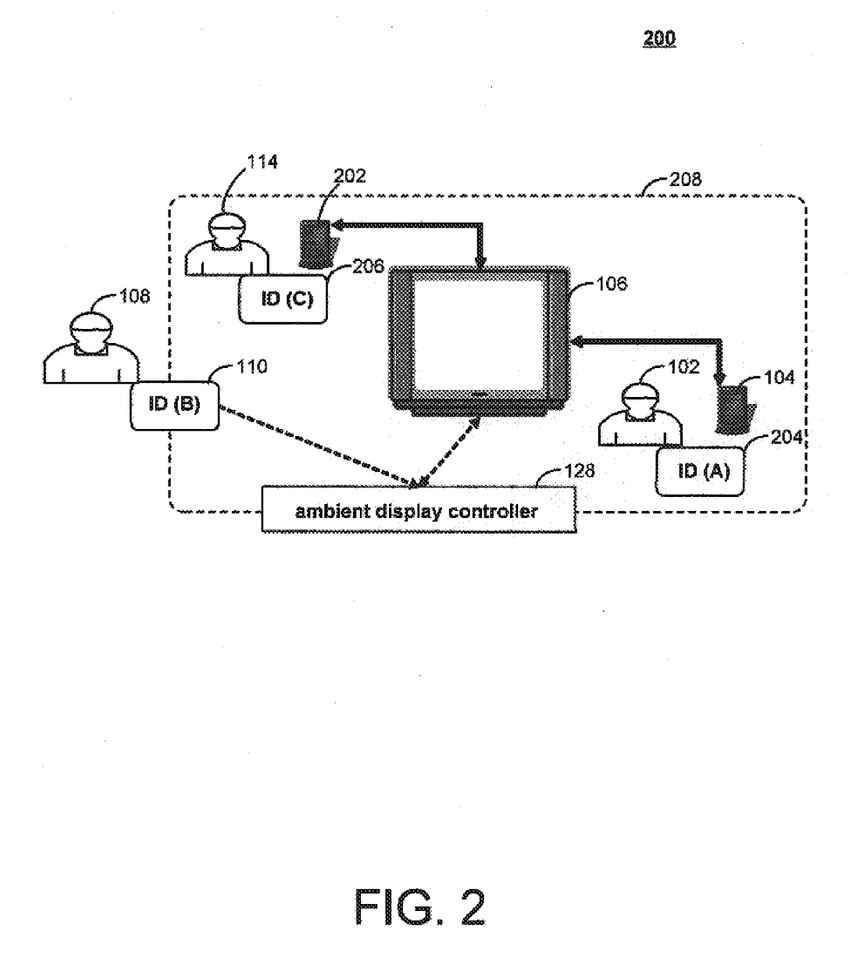
FIG. 2 is a block diagram of an alternate implementation of the system of FIG. 1.

FIG. 2 is a block diagram of an alternate implementation of the system of FIG. 1. In FIG. 2, as in FIG. 1, the user 102 is transmitting information, such as the presentation content 126, from the mobile device 104 to the ambient display 106. An audience for the information on the display 106 includes the user 114, who, in the example of FIG. 2, is using a mobile device 202 that may include the display 116 and audio output 120 of FIG. 1.

Thus, it may be the case that the user 102 is making a presentation in a conference room or other area of a given venue, and is taking advantage of the fact that limited set-up was required to begin providing the presentation to the user 114 (and other intended audience members, not explicitly shown) over the display 106. As should be understood, the presentation may include elements of either audio or video, or both, being output by the display 106, and, at a given point in time, such audio/video elements may or may not be provided to the mobile device 202 of the user 114.

For example, it may be at the discretion of either the user 102 and/or the user 114 as to whether information from the display 106 is provided at the mobile device 202. Similarly, the presentation may be simultaneously provided at the originating mobile device 102 itself, so as, for example, to provide the user 102 with control over the presentation, and/or to allow the user to view ancillary information (e.g., presentation notes, or personal information of the user 102, such as contacts' email addresses or phone numbers).

In FIG. 2, the user 102 is provided with an identifier 204, while the user 114 is provided with an identifier 206, both of which may be, for example, similar to the identifier 110 of the user 108 (e.g., an RFID tag). In some implementations, the display controller 128 may maintain a user list of all such authorized users, so that any unauthorized users (e.g., the user 108) may be determined by default.

More generally, when the unauthorized user 108 enters a perimeter 208 that is defined around the display 106, the display controller 128 (and/or the sensor 112, which may be contained within the display controller 128), may compare a security level of the user 108 against the presentation content 126 and/or security criteria 130, as described. The display controller 128 may define the perimeter 208, and a location of the user 108 relative to the perimeter, using, for example, a Global Positioning System (GPS), or other location-tracking methodology, perhaps in combination with the sensor 112 of FIG. 1. The display controller 128 may thereafter block determined portions of the presentation content 126 from the display 106.

In some implementations, such determinations may be made at least in part based on the identifiers 204 and/or 206 of the authorized recipients/attendees. For example, the security criteria 130 may have a default of allowing the display of e-mail addresses and/or other contact information, even after detection of the unauthorized user 108. However, the particular user 102 may have a set of personal preferences and/or requirements that are stored in association with the security criteria 130, such as, for example, a superseding requirement not to display such contact information in the presence of the unauthorized user 108. Continuing the example, however, it may be the case that the authorized recipient 114 has a preference that his or her personal contact information may always be displayed, so that, by accessing such information related to the user 114 and stored in association with the identifier 206, the display controller 128 may determine that all contact information on the display 106 should be blocked, except for that of the user 114.

Also, as mentioned above, the presenting user 102 may use a UI module 132 of the mobile device 104 to alter and/or supersede the decisions of the display controller 128 regarding what information to hide or not to hide. Similarly, the receiving user 114 may implement a corresponding input functionality associated with the local device 202, in order to facilitate correct display on the ambient display 106. For example, if the user 114 is a supervisor who notices that confidential information is being displayed on the display 106 in the presence of the unauthorized visitor 108 (perhaps because, for example, a security setting of the display controller was inadvertently set too low), then the user 114 may indicate/select a portion of information displayed on the device 202 (for example, particular text or images), and thereby cause a corresponding portion of the display 106 to be obscured.

Still further, and as referenced above, the display controller 128 may make use of audio outputs of the devices 104, 202, and/or the display 106, in order to continue providing information to authorized recipients 102 and/or 114, even while protecting confidential information from being received by the unauthorized user 108. For example, it may be the case that the display 106 is using the audio outputs 118 to output a new song, advertisement, company slogan or catch-phrase, or other confidential information, such as, for example, a spoken presentation being given by a remote speaker.

In such cases, the display controller 128 may similarly determine that the unauthorized user 108 is not allowed to hear the audio material, and may wholly or partially disable the audio output 118 (e.g., blocking out certain voices, sounds, or words, or reducing a volume of the outputs 118). Then, the display controller 128 may ensure that the audio output is continuously provided to audio outputs of the mobile device 104 and/or the device 202, so that the authorized recipients 102 and/or 114 may continue to receive the content.

Similarly, it may be the case that the display 106 is not currently providing any audio output when the unauthorized user 108 is detected by the display controller 128, but may simply be, for example, displaying text. In this case, a text-to-speech conversion functionality may be implemented to convert the text to an audio output, which may then be provided to the device 104 and/or the device 202, or to associated outputs.

Figure 3:
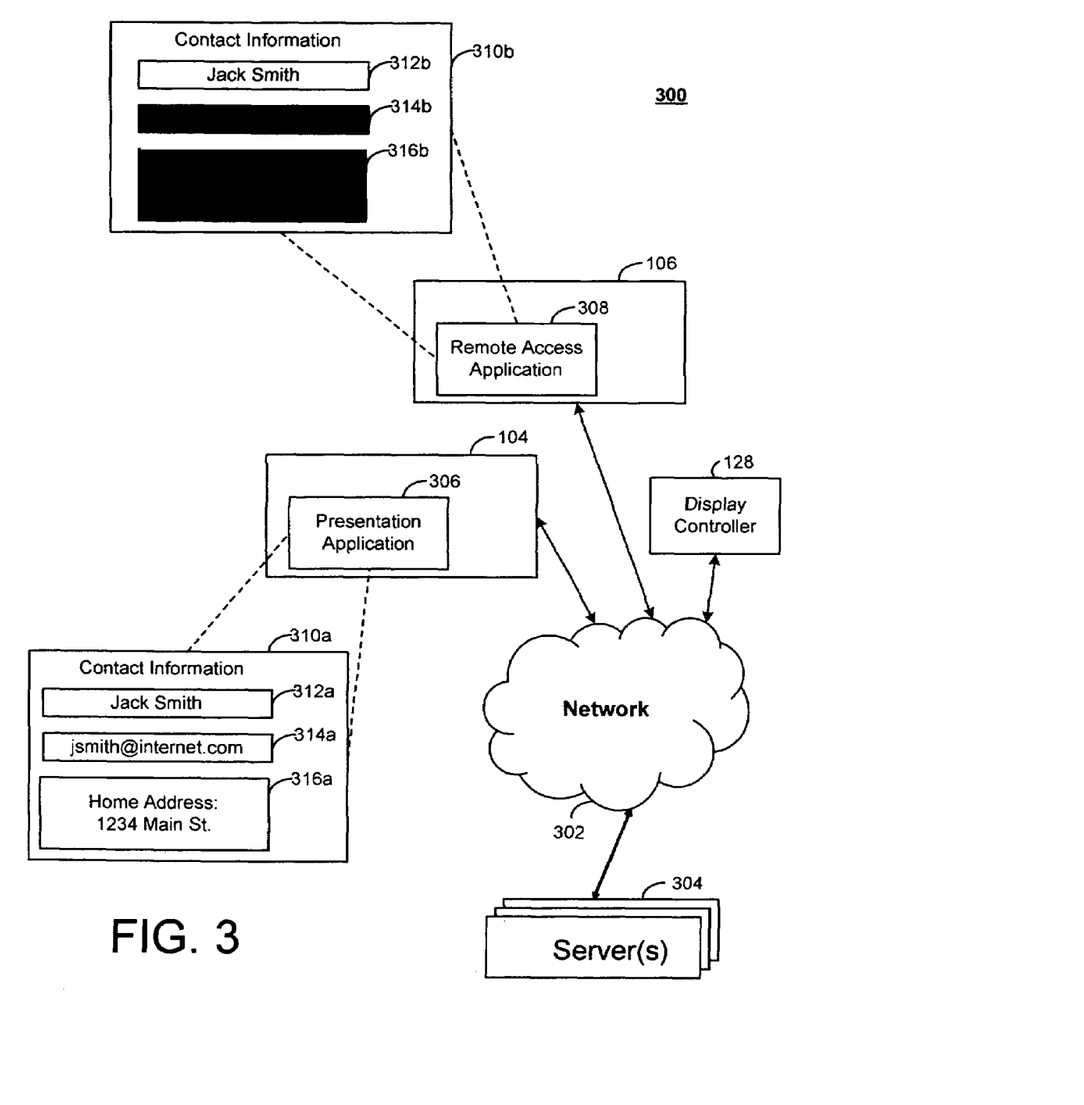
FIG. 3 is a block diagram of an alternate implementation of the system of FIG. 1.
Figure 4:
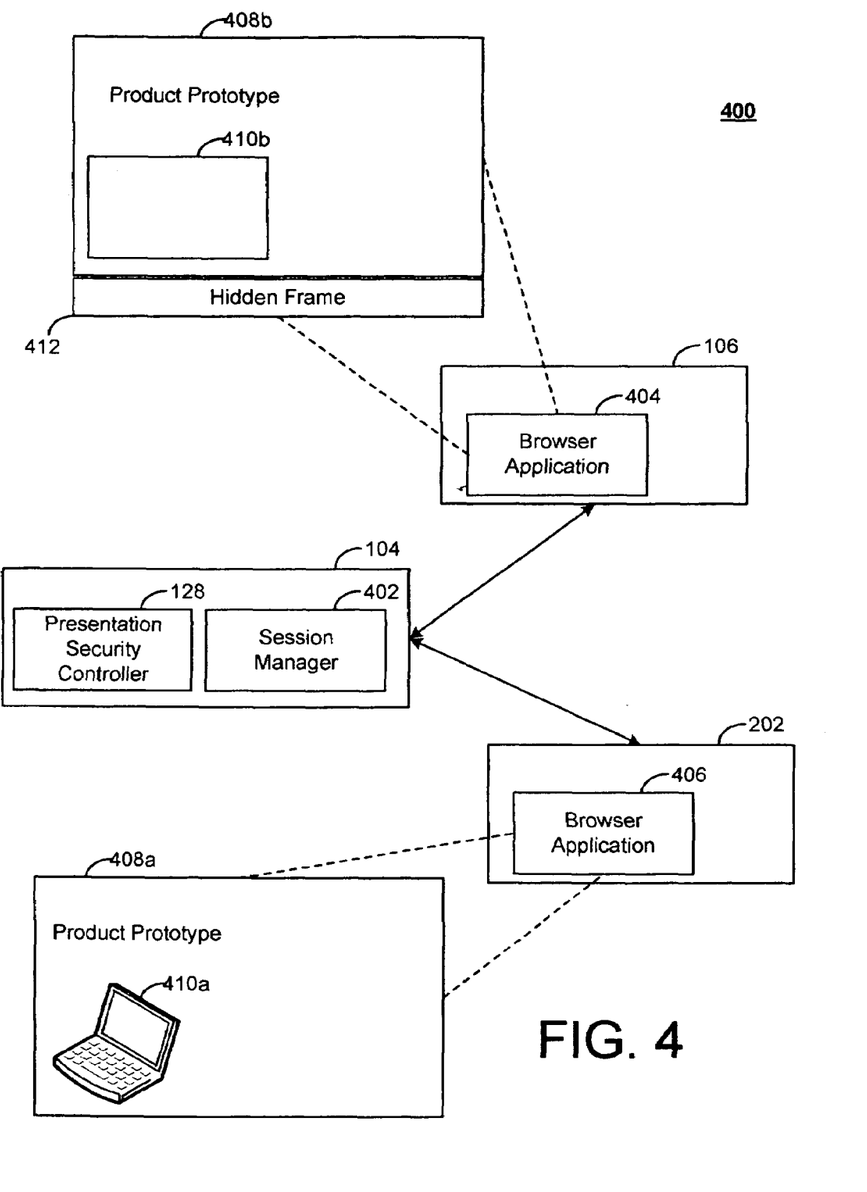
FIG. 4 is a block diagram of an alternate implementation of the system of FIG. 1.

FIGS. 3 and 4 are block diagrams of alternate implementation of the systems of FIGS. 1 and/or 2. In particular, the examples above illustrate possible positionings of (elements of) the display controller 128 either within the mobile device 104, and/or the ambient display 106, and/or perhaps separate from both the device 104 and the display 106 (e.g., disposed in connection with the sensor 112). Moreover, the controller(s) 128 may be in direct communication with one another, or may be communicating over a network, such as, for example, a wireless local area network (WLAN) or a peer-to-peer network.

FIG. 3 thus provides a particular example, in which the mobile device 104 and the display 106 are in communication over a network 302, perhaps communicating with one or more server(s) 304. In this example, the display controller 128 is in communication with the network 302, but may be remote from the mobile device 104 and/or the display 106.

In FIG. 3, the mobile device is running a presentation application 306 that is designed to transmit content to a remote access application 308 running on the display 106. For example, the presentation application 306 may include, or be associated with, a terminal services application and/or a universal plug-and-play (UPnP) application that finds, identifies, and initiates communication with, the display 106. The remote access application 308 may include, for example, a remote access protocol that is designed to interact with the presentation application 306. In this and similar implementations, then, the display controller 128 may mediate communications between the mobile device 104 and the display 106, by, for example, eavesdropping on the communications and blocking appropriate portions thereof, based on corresponding security determinations.

In particular, in the example of FIG. 3, the mobile device 104 displays a screen 310a, which displays contact information for an individual "Jack Smith" (i.e., a name in a line 312a, an e-mail address in a line 314a, and a home address in box 316a). At a given time, and as described herein, an unauthorized user may enter a vicinity of the display 106, which, although perhaps previously displaying the information of the screen 310a, is partially obscured so that a screen 310b on the ambient display 106 only shows corresponding name information in a line 312b, but blocks out the e-mail address in a line 314b and a home address in line 316b.

As described above, the blacked-out contact information in lines 314b and 316b may nonetheless continued to be output on the mobile device 104. Further, the blacked-out contact information in lines 314b and 316b may be output to a third device, e.g., of an authorized recipient such as the user 114, who may have been viewing this information on the display 106 prior to a presence of the unauthorized user 108. In some implementations, the blacked-out contact information in lines 314b and 316b may be presented to authorized users 102 and 114 in another output format than the format of the screen 310a. For example, the blacked-out contact information in lines 314b and 316b may be produced in audio form for presentation to the user by way of an earpiece or other audio output.

In some implementations, the presentation content 126 need not be stored locally to the mobile device 104, and may be stored on the server(s) 304, instead. In this case, both the mobile device 104 and the display 106 may communicate with the server(s) 304 to obtain and display the presentation content. Thus, the display controller 128 may observe communications between the server(s) and the mobile device 104/display 106 over the network 302, in order to implement the various features and advantages described herein.

In FIG. 4, an implementation is shown in which the display controller resides in whole or in part on the mobile device 104. Additionally, a session manager 402 resides on the mobile device 104 that is operable to maintain an active session within a browser application 404 running on the display 106 and within a browser application 406 running on the device 202. In this way, the session manager 402 provides the presentation content 126 for display on both the ambient display 106 and the local device 202.

Of course, although not explicitly shown in FIG. 4, a browser or other application also may be running on the mobile device 104 itself. Also, although not shown in FIG. 4, the session manager 402 may operate in whole or in part by communicating with the server(s) 304, perhaps over the network 302. In some implementations, the session manager 402 may run on the server(s) 304.

In operation, then, the session manager 402 may be written as a servlet application that maintains an active session with the browser application 404 of the display 106 and/or the browser application 406 of the device 202. The session manager 402 may thus provide a screen 408a for display on the browser application 406, in which an image 410a of a confidential product prototype is displayed.

In providing a corresponding screen 408b for display on the browser application 404, the session manager includes a hidden frame 412, that may be refreshed separately from the screen 410b. Fields of the hidden frame 412 may be mapped to fields of the screen 408b on a one-to-one basis, and values and/or content from fields of the hidden frame 412 may be written to corresponding fields of the screen 408.

Thus, when the display controller 128 determines that the unauthorized user 108 is within a viewing distance of the display 106, the session manager 402 may be notified and may refresh the hidden frame 412, such that a blocked-out portion of the hidden frame 412 corresponding to a portion 410b of the screen 408b is written to the corresponding portion 410b. In other words, the session manager 402 executes a browser push by which the hidden frame 412, and subsequently the screen 408b, are refreshed, and the refreshed version of the screen 408b includes the blocked-out portion 410b, thus preventing viewing of the prototype in portion 410a of the screen 408a by the unauthorized user 108.

Figure 5:
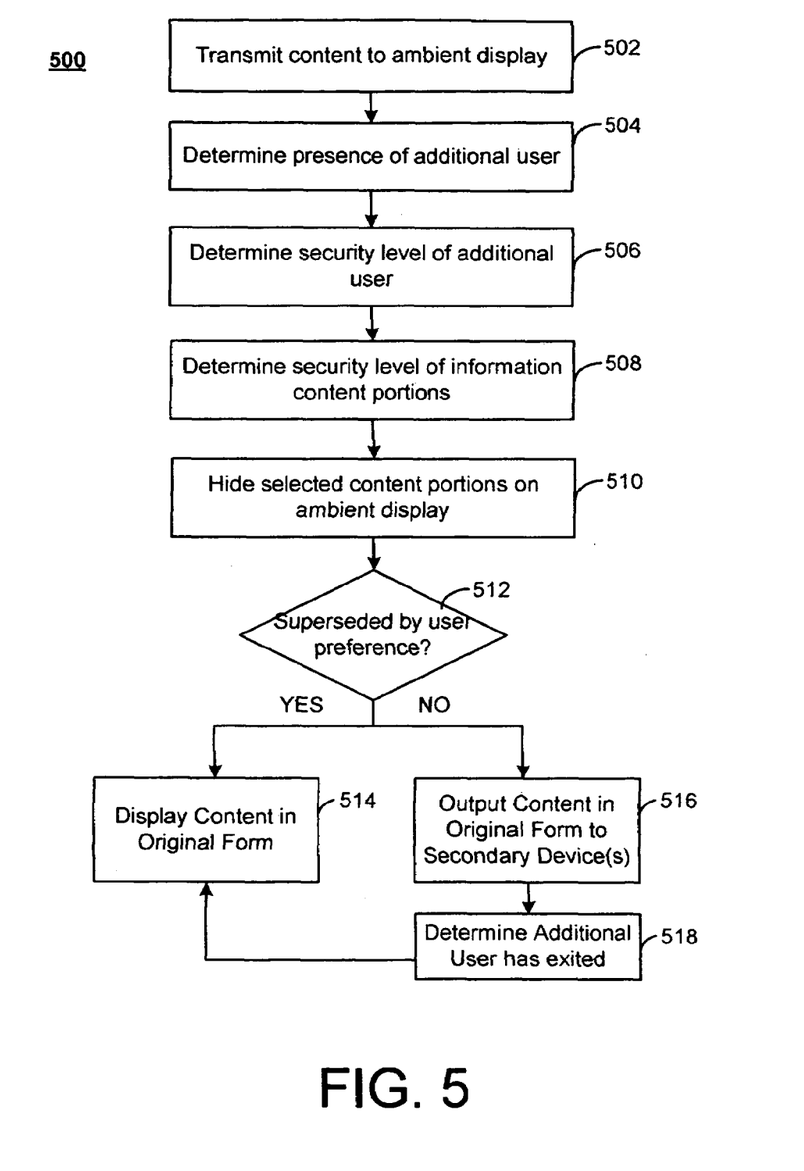
FIG. 5 is a flowchart illustrating a process for implementing the systems of FIGS. 1-4.

FIG. 5 is a flowchart 500 illustrating a process for implementing the systems of FIGS. 1-4. In FIG. 5, information content is transmitted from a first device to an ambient display (502). For example, the user 102 may transmit content from the mobile device 104 to the ambient display 106. As already described, such transmission may occur by direct transmission, or by common communication over an available network. As also described, the transmitted content may continue to be output at the originating device, e.g., the mobile device 104. In this way, the user 102 may easily share information with one or more members of a conference or meeting.

Then, a presence of an additional user is determined (504). For example, the user 108 may walk into a viewing area of the ambient display 106, where the user 108 may be, as described, an authorized visitor with a low security clearance, or may be an unauthorized visitor. As also described, the presence of such an additional user may be determined by way of identifiers (e.g., an employee or visitor badge worn by the additional user) that are detected by one or more sensors. Such detection techniques obviate a need for the presenting user 102 and/or authorized recipient(s) 114 to observe/decide/implement security measures, which may be difficult and/or counter-productive when the focus of these users should be on the presentation at hand. Nonetheless, additionally or alternatively, the presence of such an additional user may be determined by visual or aural detection thereof by the user(s) 102/114.

A security level of the additional user may then be determined (506). For example, the display controller 128 may access security criteria 130 to determine, based on the detected identifier(s) 110, a security level of the user 108. Although many security classifications may be devised, in one example, security clearance levels may be provided on a level of 1-10, and the additional user may be classified accordingly.

Then, a security level of various portions of the information content may be determined (508). For example, in the security scheme just referenced, information may be assigned a clearance level of 1-10. That is, the user 102 may assign such values when preparing the presentation, and/or such values may be assigned based on a type or class of information, or an origin of such information (e.g., if stored in a personal address book of the user 102).

Based on the detected presence and determined security level of the additional user, and on a correlation of this information with some or all of the information content, selected portions of the information content being displayed on the ambient display 106 are hidden (510). For example, the display controller may cause the mobile device 104 to retransmit the current portion of the information content, with the secure portions blocked out, as described above.

If these actions of the display controller 128 are superseded by user preference and/or input (512), then the original information content may be restored to its original form on the ambient display 106 (514). For example, if the user 102 who is giving a presentation recognizes the additional user and determines that he or she should be allowed to view the information content, then the user 102 may so indicate by selecting the hidden portion(s) of the information content, e.g., using a user interface associated with the mobile device 104. In particular, if the user 102 would like to reveal specific portions of the hidden information (e.g., the e-mail address in line 314b of FIG. 3), then the user 102 may select this line using, for example, a stylus or other input mechanism. In this way, the e-mail address of line 314b may be revealed, while the home address information of box 316b remains hidden.

Of course, as also discussed herein, the user preference need not take the form of such an affirmative action. For example, preferences of the user 102 may be stored in association with the security criteria 130, so that the display controller 128 may make exceptions or determinations as those just described, without specific input from the user 102.

If user preference(s) do not supersede the actions of the display controller 128 (512), then the original information content may be output in its original form to one or more secondary devices (516). For example, the information content (e.g., the hidden line 314b, hidden box 316b, and blocked image 410b) may still be displayed at the mobile device 104, and, additionally or alternatively, may be displayed at the secondary device 202 of the authorized user 114. As mentioned, such supplemental content allows the user 102 to maintain a control and understanding of the presentation, and allows authorized recipients to continue receiving the content, either by visual or audio output.

Finally, it may be determined whether the additional user has exited (518), e.g., has moved out of range of the display 106 and/or the sensor 112. If not, then it should be understood that the display controller 128 may continue blocking the information content, whether statically or dynamically. That is, for example, if the information content includes streaming video or audio, then the display controller 128 may make decisions in real-time or near real-time as to what information in the stream(s) should be output and what information should be blocked. Once the additional user has exited, however, the display controller 128 may again allow a display of the information content in its original form (514).

Accordingly, the implementations described herein allow a user to conduct a presentation or other information-sharing session through communications between a smaller device and a larger device/display, so that the users are provided with the convenience, portability, and personalization of the smaller device, as well as with the size and convenience of the larger display. As described, such users may be assured that a security of the shared information is maintained, even while the users are focused on the sharing of the information (e.g., focused on making or attending a presentation), since secure or confidential information on the larger display will be hidden or otherwise blocked out by the implementations described. Further, the users may continue to discuss or view the shared information, since the shared information may be individually provided (either continually and/or in response to the hiding of the secure information) to the conference attendees. Additionally, some or all of the users may exercise control over the shared information, even after secure/confidential portions have been blocked or obscured, since, for example, any user with the proper authorization may indicate that displayed information should be hidden (or, conversely, that hidden information should be displayed). For example, and perhaps depending on the information to be presented/ hidden, such authorization may be limited just to the user conducting the presentation (particularly, e.g., with respect to personal information related to that user), or such authorization may be shared with one or more of the other attendees.

Since users (e.g., the user conducting the conference, and/ or other conference attendees) may be focused on the shared information, and may not see user 108, the described implementations allow for automatic security of confidential information, without required action on the part of the user(s). Although the implementations are discussed in terms of unauthorized users being within a seeing or hearing distance of the ambient display(s) in question, it should be understood that other parameters may be defined. For example, any visitor to a site may cause activation of a number of display controllers, simply by entering the site, and even if the visitor is not within a sightline of a given display.

Also, the security criteria, e.g., the security criteria 130, may include criteria set by the presenting user, or by security personnel in charge of maintaining enterprise confidences, or by employers or managers in charge of overseeing a given presenter. Further, security criteria may be set based on heuristics determined over a period of time for a number of users, as to what (types of) information certain (classes of) users wish to keep in confidence.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods may be performed by one or more programmable processors executing a computer program to perform functions by operating on input data and generating output. Methods also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A computer-implemented method comprising:

providing information from a mobile device of a presenting user to a first device, for outputting to at least one recipient, using a first output mode of the first device;

determining, using a proximity sensor, an authorization of a person in proximity to the first device to receive the information;

preventing a subset of the information from being output at the first device using the first output mode, based on the authorization;

outputting at least the subset of the information to the recipient at a second device, using a second output mode, while outputting at least the subset of the information to the presenting user using the mobile device; and providing, to the presenting user and using the mobile device, control of the output of the information at the mobile device, the first device, and the second device.

2. The method of claim 1 wherein providing information to a first device comprises:

transmitting the information from the mobile device to the first device, where the mobile device is in proximity to the first device and the first device includes a multi-user display as the first output mode.

3. The method of claim 1 wherein providing information to a first device comprises:

transmitting the information for an audio and/or visual display thereof at the first device.

4. The method of claim 1 wherein determining an authorization of a person in proximity to the first device to receive the information comprises:

receiving location information regarding a location of the person relative to the first device.

5. The method of claim 4 wherein receiving location information regarding a location of the person relative to the first device comprises:

receiving information using the proximity sensor from an identifier associated with the person.

6. The method of claim 1 wherein determining an authorization of a person in proximity to the first device to receive the information comprises:

accessing security information associated with the person, relative to the information.

7. The method of claim 1 wherein preventing a subset of the information from being output at the first device using the first output mode comprises:

blocking visual portions of the information displayed at the first device.

8. The method of claim 7 wherein blocking visual portions of the information displayed at the first device comprises:

re-transmitting the information to the first device with blocked-out visual portions.

9. The method of claim 1 wherein preventing a subset of the information from being output at the first device using the first output mode comprises:

receiving a designation of at least a part of the subset from the presenting user by way of the mobile device.

10. The method of claim 1 wherein outputting at least the subset of the information to the recipient at a second device comprises:

outputting either an audio, video, text, and/or image within the information at the second device as audio output as the second output mode.

11. The method of claim 1 wherein providing, to the presenting user and using the mobile device, control of the output of the information at the mobile device, the first device, and the second device comprises:

receiving an indication of greater and/or lesser security from the recipient; and outputting a modified subset to the recipient, based on the indication.

12. A system including functional descriptive material recorded on a computer-readable medium, the system comprising:

an originating device associated with a presenting user, and that is operable to output information to an output device and thereby to a recipient; and an output controller associated with the originating device and including functional descriptive material recorded on a computer-readable medium, and that is operable to determine a presence of an additional user relative to the output device, and further operable to prevent at least a portion of the information from being output at the output device, based on the determination, wherein the output controller is further operable to output at least the portion of the information at a secondary output of a secondary device of the recipient, for receipt thereof by the recipient, and wherein the output controller is further operable to provide, to the presenting user and using the originating device, control of the output of the information at the originating device, the output device, and the secondary device.

13. The system of claim 12, wherein the secondary output includes a visual and/or auditory output at the secondary device that is local to the recipient.

14. The system of claim 12, wherein the originating device is operable to receive an input of the presenting user and/or the recipient, and further operable to modify the portion of the information based thereon.

15. An apparatus comprising a storage medium having instructions stored thereon, wherein the instructions, when executed on a data processing apparatus, cause the data processing apparatus to:

determine a transmission of information from an originating device to a multi-user output device, for receipt therefrom by a recipient;

determine a presence of a potentially-unauthorized user relative to the multi-user output device;

block a portion of the information from output by the multi-user output device, based on the presence; and output at least the portion of the information at a secondary output, for receipt therefrom by the recipients, wherein the originating device and a secondary device are in proximity to the multi-user output device, and wherein the instructions further cause the data processing apparatus to provide at least the portion of the information at the originating device and at the secondary output of the secondary device, and to provide control of a display of at least the portion of the information at both the originating device and the secondary device to an operator of the originating device.

16. The apparatus of claim 15 wherein the recipient includes either an originating user of the information at the originating device, and/or a receiving user of the information at a receiving device that is separate from the originating device.

17. The apparatus of claim 16 wherein the instructions further cause the data processing apparatus to:

receive a modification of the portion of the information from either the originating user and/or the receiving user; and modify the blocking of the portion of the information, based on the modification.

\* \* \* \* \*